United States Patent
Rees et al.

(10) Patent No.: US 7,371,137 B2
(45) Date of Patent: May 13, 2008

(54) AMPHIBIOUS VEHICLE SUSPENSION

(75) Inventors: Phillip Frederick Rees, Kidderminster (GB); Anthony Roy Mudd, Nuneaton (GB)

(73) Assignee: Gibbs Technologies, Ltd. (GB)

( * ) Notice: Subject to any disclaimer, the term of this patent is extended or adjusted under 35 U.S.C. 154(b) by 0 days.

(21) Appl. No.: 10/551,749

(22) PCT Filed: Mar. 29, 2004

(86) PCT No.: PCT/GB2004/001422

§ 371 (c)(1),
(2), (4) Date: Dec. 4, 2006

(87) PCT Pub. No.: WO2004/087443

PCT Pub. Date: Oct. 14, 2004

(65) Prior Publication Data

US 2007/0167092 A1    Jul. 19, 2007

(30) Foreign Application Priority Data

Mar. 31, 2003  (GB) .............................. 0307318.6

(51) Int. Cl.
  *B60F 3/00*   (2006.01)
  *B60K 28/00*  (2006.01)
(52) U.S. Cl. ..................... 440/12.54; 180/209
(58) Field of Classification Search ........... 440/12.5, 440/12.54
  See application file for complete search history.

(56) References Cited

U.S. PATENT DOCUMENTS

| | | | |
|---|---|---|---|
| 2,173,793 A | 9/1939 | Doblhoff | |
| 3,114,347 A | 12/1963 | Trippel et al. | |
| 3,280,785 A | 10/1966 | Mycroft | |
| 3,860,982 A | 1/1975 | Rumsey | |
| 5,531,179 A | 7/1996 | Roycroft et al. | |
| 5,570,653 A * | 11/1996 | Gere et al. | 440/12.51 |
| 5,687,669 A | 11/1997 | Engler | |
| 5,755,173 A | 5/1998 | Costa et al. | |
| 2004/0072479 A1* | 4/2004 | Roycroft | 440/12.5 |

FOREIGN PATENT DOCUMENTS

| | | |
|---|---|---|
| EP | 0 895 881 | 2/1999 |
| EP | 1 153 775 | 11/2001 |
| WO | WO 90/11903 | 10/1990 |

* cited by examiner

*Primary Examiner*—Jesús D Sotelo
(74) *Attorney, Agent, or Firm*—Calfee Halter & Griswold LLP

(57) ABSTRACT

An amphibious vehicle, which may plane on water, has at least one pair of front or rear wheels having wheel suspensions fitted with an anti-roll bar (46). Said bar rotates upwards as the wheels are stowed above the waterline for use of the vehicle on water. The wheels may be driven wheels, and may be steered by pivotable steering link (20); or passively steered. Anti-roll bar (46) may be mounted to the vehicle by at least one bearing (48), so that the bar rotates about a single axis when the wheels are retracted. The bar passes through watertight outside bodywork (60), where it may be sealed by an elastomeric seal (62). Said seal may comprise a lip portion (72), sealing against the bar itself or against a ring or a collar (68) attached thereto. The ring or collar may be continuously welded around the anti-roll bar.

17 Claims, 5 Drawing Sheets

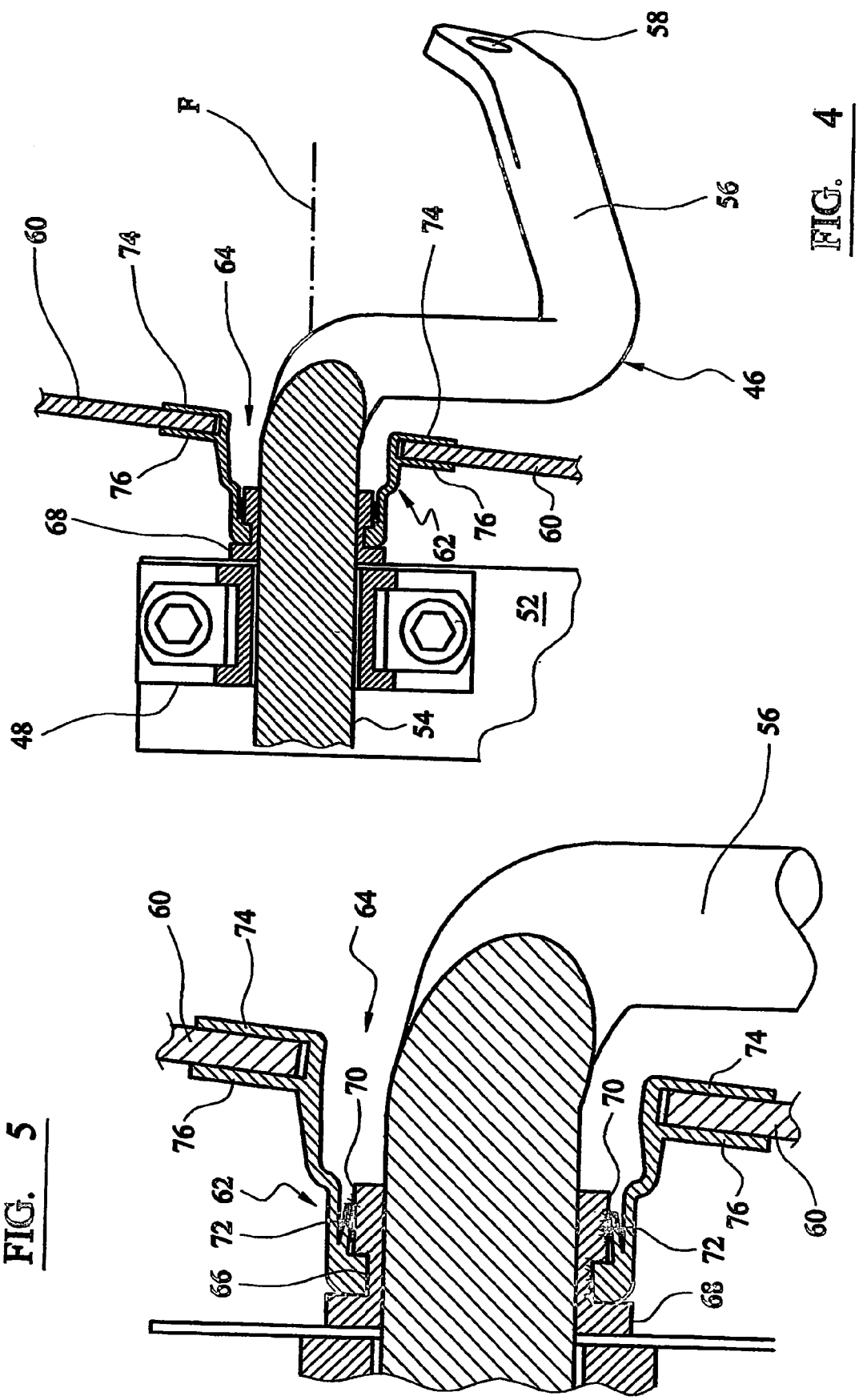

under the terms of the Roycroft patent be outside the scope of that patent.

AMPHIBIOUS VEHICLE SUSPENSION

CROSS REFERENCE TO RELATED APPLICATIONS

The present application is the U.S. national phase entry of PCT/GB2004/001422 with an international filing date of Mar. 29, 2004 and claims priority from GB Patent Application Ser. No. 0307318.6, filed Mar. 31, 2003, and since granted as GB 2400082.

FIELD OF THE INVENTION

The present invention relates to an amphibious vehicle; and particularly to such a vehicle having at least one pair of wheels arranged to retract from road mode to marine mode.

BACKGROUND OF THE INVENTION

Such a vehicle is shown in U.S. Pat. No. 5,531,179 (Roycroft). In order to improve road performance, it has been proposed to provide anti-roll bars for amphibians. However this proposal has only, so far as is known, been applied to a slow speed, low marine performance, vehicle such as the Hobbycar. This vehicle was a displacement vessel with an advertised top speed of 5 knots in water; its anti-roll bar was located outside of the hull. For high performance in the marine mode, it is necessary to reduce any external protrusions so that the vehicle can be made to plane.

When a marine vessel is designed to plane, marine handling in cornering is generally much improved if the hull has a deadrise: that is, it is angled upwards at either side from the keel, which passes along the longitudinal centre line of the vessel. Such a hull profile will inevitably raise the centre of gravity of the vessel when compared to a flat bottomed hull. When such a vessel is an amphibious vehicle with alternative use on road, the raised centre of gravity may markedly increase roll angles on the road, unless an anti-roll bar is fitted.

As has been proposed in the Roycroft vehicle mentioned above, the front and indeed also the rear road wheels (it is a four wheeled vehicle) are ranged to fold upwards substantially above the waterline in marine mode. That is, the wheels when retracted are laterally closer to each other, than when protracted in road mode. There is therefore a problem when linking the wheel suspensions by an anti-roll bar, as to how to fold and retract the wheels. A conventional anti-toll bar would inhibit movement of wheels on opposite sides of the body towards each other.

SUMMARY OF THE INVENTION

According to the invention, an amphibious vehicle having a hull is provided with at least a pair of wheels on opposite sides of the vehicle, each wheel of the pair being mounted by means of a suspension to the body of the vehicle, the suspension being so arranged as to be enabled by retraction means to retract its wheel upwards into a stowed position, an anti-roll bar being mounted so as to connect the suspensions on opposite sides of the vehicle, the anti-roll bar being further arranged to partially rotate from a first position in road mode to a second position in marine mode.

In this context, the term "partially rotate" refers to rotation through an arc of less than three hundred and sixty degrees; as opposed to a part only of the bar rotating.

The suspension may be a front or a rear suspension. The wheels may be steered, passively steered, or not steered; and may be driven wheels.

The ability for the anti-roll bar to rotate enables the anti-roll bar to be mounted within the hull of the vehicle so that it does not cause water flow problems below the hull in the marine mode. Preferably, the anti-roll bar is mounted in at least one bearing within the vehicle, so that when the wheels are retracted, the anti-roll bar rotates about a single axis. This provision ensues the anti-roll bar protrudes through the hull of the vehicle through a minimum sized opening. In turn, this ensures that sealing arrangements between the hull and the and-roll bar are kept as simple and as cost effective as possible.

A preferred form of seal for the anti-roll bar is mounted inside the hull, so as to ensue an optimum hull shape. To achieve an adequate water seal in a position where the anti-roll bar is usually above the water line when the vehicle is planing, the seal has an internal circular lip portion extending outwardly from an inner part of the seal, the lip portion being arranged to seat against the bar; or against a ring or a collar around the bar. Water pressure mostly caused by the vehicle slamming on the water when planing is therefore arranged to act on the lip to improve sealing.

Alternatively, the seal may be mounted outside the hull, with the internal circular lip portion extending inwardly from an outer part of the seal. This may improve seal performance by allowing water pressure to act over a greater area, but requires a different hull shape to package the seal effectively without leaving it open to damage by foreign objects.

BRIEF DESCRIPTION OF THE DRAWINGS

The invention will now be described with reference to the accompanying drawings in which:

FIG. 4 is a cross sectional front view of an anti-roll bar being part of the suspension of FIG. 2;

FIG. 5 is an enlarged view of part of FIG. 4 showing sealing;

DETAILED DESCRIPTION OF THE INVENTION

Figure 1:
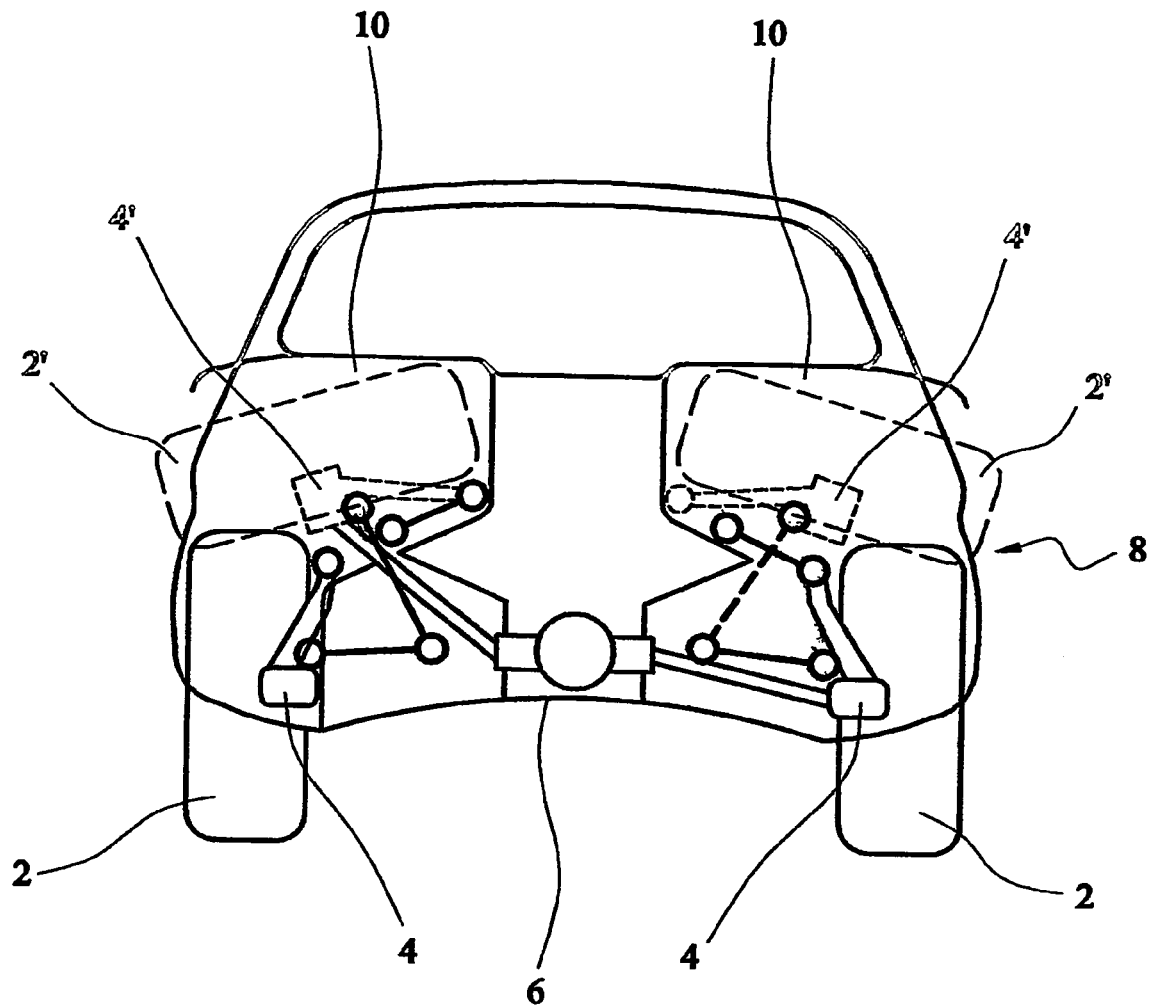
FIG. 1 is a front view of the Roycroft amphibious vehicle shown in U.S. Pat. No. 5,531,179, with the front wheels in road mode, and in broken lines in marine mode.

In FIG. 1, Roycroft's amphibious vehicle as described in U.S. Pat. No. 5,531,179 is shown with the front wheels 2 shown in unbroken lines down in road mode and at 2' in broken lines up in marine mode. The wheel bearings are also shown at 4 in the road mode. position and at 4' in the marine mode position. The bottom 6 of the hull 8 of the vehicle forms a lower part of a clearly necessary watertight whole. The wheels 2 are designed and arranged to be outside the watertight area; and to fold upwards into pockets 10. This Roycroft vehicle did not have an anti-roll bar, which would have been apparently a problem to arrange since at least the wheel bearings 4' are closer together than those at 4.

Figure 2:
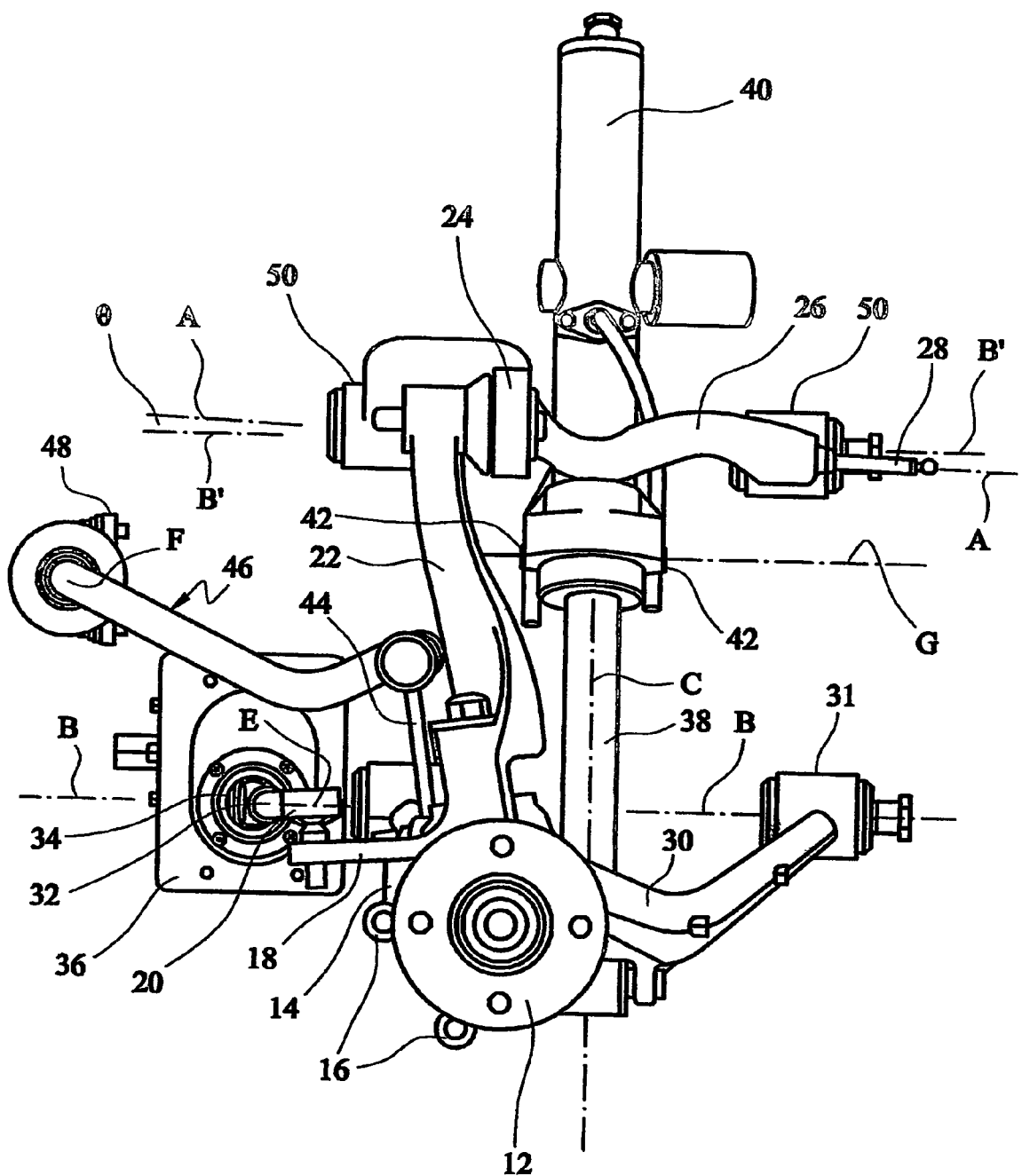
FIG. 2 is a perspective side view of a front suspension in road mode, for a planning amphibious vehicle according to the invention, modified from that shown in FIG. 1.
Figure 3:
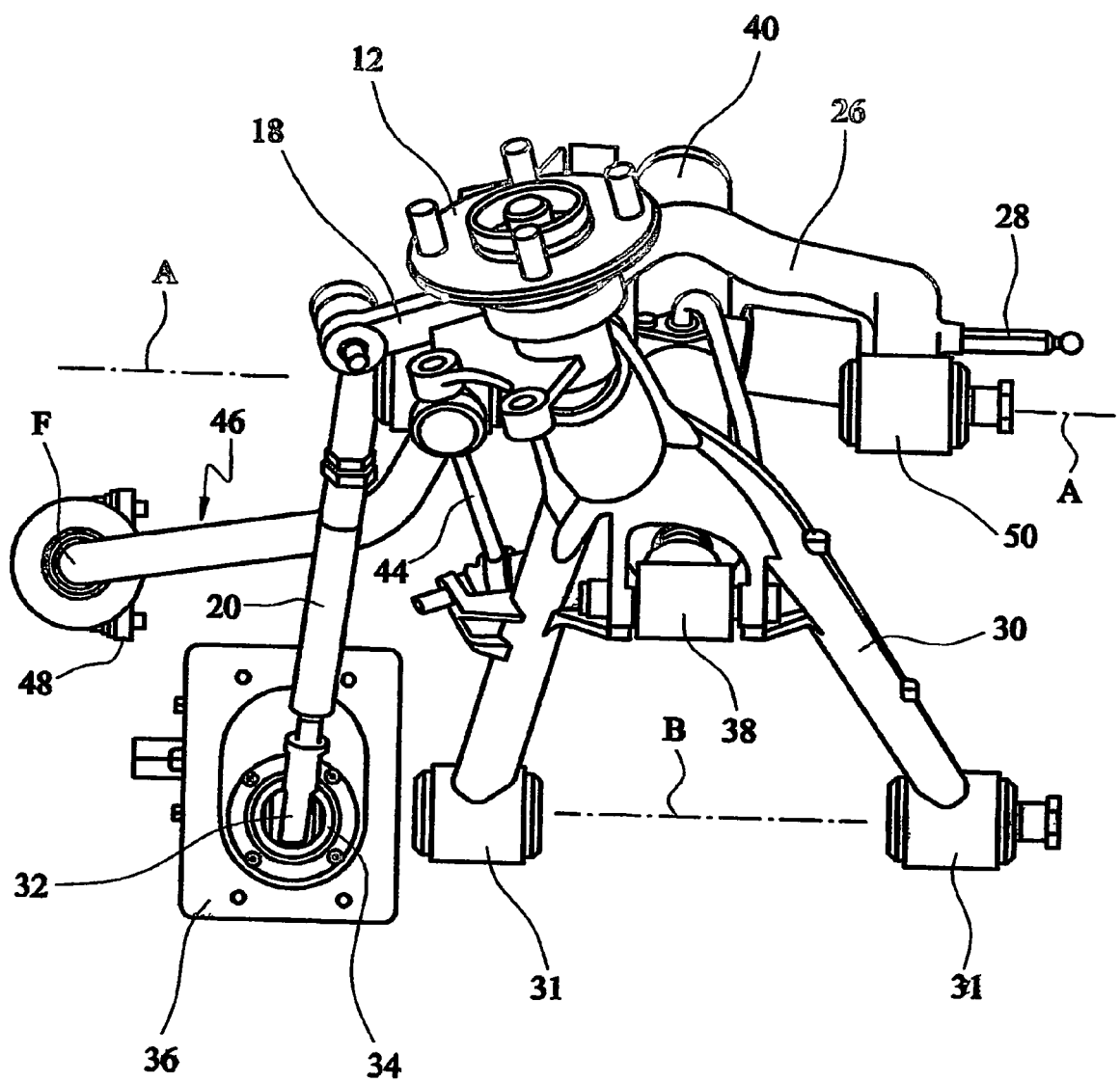
FIG. 3 is a perspective side view of the front suspension of FIG. 2 in marine mode.

In FIGS. 2 and 3, the suspension of the invention is shown in detail, and comprises a wheel hub plate 12 mounted for rotation on bearing component 14 known as an upright, having mountings 16 for a broke caliper (not shown). Upright 14 has a minor arm 18 extending forwardly to receive the outer end of steering link 20; and a major arm 22 extending upwardly to connect by means of a horizontal ball joint 24 with top arm 26. The top arm has a rearward extension 28 which receives part of a suspension height sensor, enabling water depth sensing as described in the applicant's co-pending GB patent application no. 0128338.1.

Supporting the lower part of upright 14 is a bottom wishbone 30, which is pivotally mounted to the vehicle body by bushes 31 for pivotal movement about axis B which intersects axis B of steering arm 32. Steering arm 32 is mounted in water tight bush 34 in bush plate 36, which is secured to the vehicle body. Also pivotally attached to the bottom wishbone 30 is piston rod 38 arranged to extend and retract along C from and into hydraulic cylinder 40; which is pivotally mounted about axis G to the vehicle body at pivot points 42, as described in the applicant's co-pending patent application, published as WO 02/44006. Further linked to bottom wishbone 30 by anti-roll bar link 44 is anti-roll bar 46, which is mounted for rotation about axis F in bracket 48 secured to the vehicle body as will be described below.

Top arm 26 is also pivotally mounted to the body by bushes 50 for pivotal movement about axis A, which is tilted at an angle θ from line B'; which in turn is parallel to lower pivotal axis B. θ may vary from 2° to 3°, but is typically set at about 2.4° to inhibit dive. Axis A is normally three to four degrees to the horizontal, and in this case preferably about 3.5°. Axis G is parallel to axis B, and perpendicular to axis C.

Although the suspension is here shown for a steered wheel, it may be applied to a non-steered wheel by using link 20 as a track control arm, fixed directly to the vehicle body rather than to a steering arm 32 as shown. It is also known in the automotive engineering art to use passive steering to adjust the steering angle of wheels not steered by the driver, causing the wheels to "toe in" or to "toe out". Such a system can be tuned to make chassis behaviour in cornering, in braking, or even in crosswinds, more predictable. In the case of the suspension shown in the figures, such passive steering may be introduced by careful selection of suspension geometry, and by adjustment of hardness of suspension bushes in different axes (x, y, and z-not shown). Equally, the suspension could be adapted to a driven pair of wheels by adding a drive shaft (not shown).

Turning to FIGS. 4 and 5, the anti-roll bar 46 is shown from the front of the vehicle; part of whose body 52 has bearing 48 arranged to pivotally support bar 46. The bar comprises a central straight portion 54 and a cranked portion 56 at each and (only the near side end being shown). At the terminal end of each portion 56, a hole 58 is provided to attach link 4 by a pivotable connection.

In order to ensure that the bar 46 is sealed to the exterior watertight bodywork 60 of the vehicle, an elastomeric seal 62 is provided in hole 64 in the watertight bodywork. Seal 62 extends inwardly into the vehicle and engages with annular groove 66 of collar 68, which is fixed—preferably by welding—to portion 54 of bar 46. Conventionally, such a collar would be welded to the bar by tack welding only; but for waterproofing, it has been found best for marine use to weld the collar continuously all the way around the bar. Collar 68 has an outwardly facing cylindrical potion 70 which provides a secondary seating surface to the primary sealing surface of groove 66. The seal has an outwardly directed lip portion 72, which is biased against cylindrical surface 70; so that water entering hole 64 under pressure caused by the vehicle slamming on the water at high speed tends to tighten the seal. Said seal is fixed into hole 64 by outer and inner flanged parts 74 and 76.

Collar 68 is used to provide a groove 66 for sealing purposes, but use of this collar—or a simpler ring form 78 as described below with reference to FIGS. 6 and 7—is optional. To save additional parts count and the welding operations, grooves 66 could be cut straight into anti-roll bar 46 at each end. The bar would then have to be made from larger diameter stock, as its effective diameter, controlling its behaviour as a torsion spring, would be the diameter at the base of groove 66.

The cranking of portion 56 of the anti-roll bar is designed so as to be insertable trough holes 64 in the bodywork 60 during vehicle assembly; avoiding the additional cost and complication of a two-part anti-roll bar. It will be noted from FIGS. 2 and 3 that as the wheels are retracted upwardly into a stowed position by retraction means comprising cylinder 40 and piston rod 38 (FIG. 3), the anti-roll bar 46 is caused to partially rotate from its first position in FIG. 2 to its second position in FIG. 3. From a static position on the road with driver only in the vehicle, the angle of rotation upwards about axis F of the anti-roll bar is between twenty seven and forty seven degrees; but preferably in the embodiment shown, about thirty seven degrees. Furthermore, anti-roll bar 46 may rotate downwards by up to eighteen degrees as the wheel droops when the amphibious vehicle is floating— usually during marine to land conversion, or vice versa.

Figure 7:
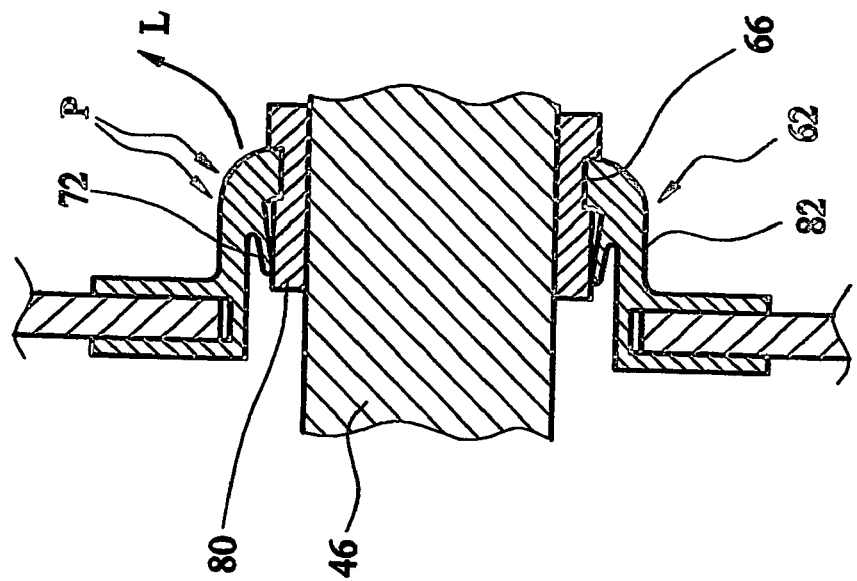
FIG. 7 is an enlarged view of pat of FIG. 6 showing sealing.
Figure 6:
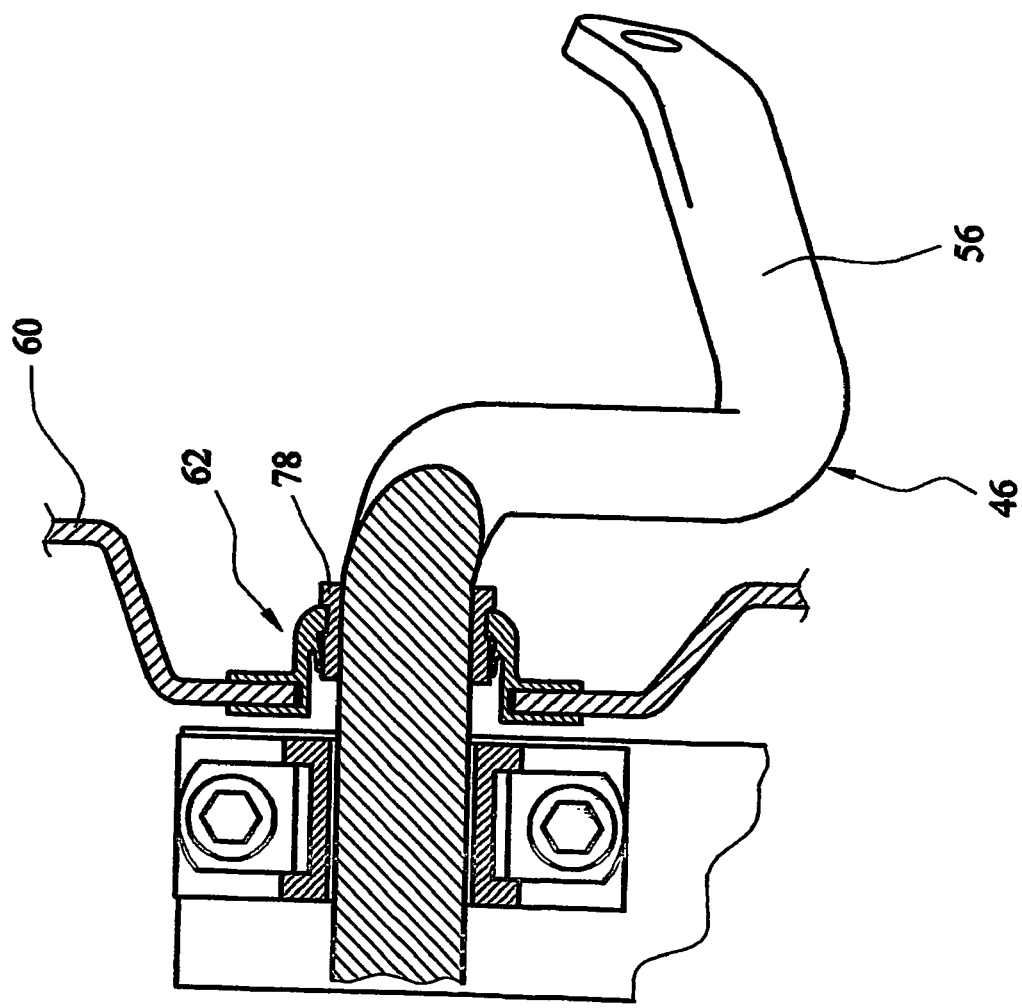
FIG. 6 is a cross sectional front view of an anti-roll bar being part of the suspension of FIG. 2, with an alternative scaling arrangement.

An alternative embodiment of the sealing arrangement is shown in FIGS. 6 and 7. In this case, ring 78 (corresponding to collar 68 in the embodiment of FIGS. 4 and 5) and seal 62 are reversed in their orientation on bar 46. Ring 78 is more economical in its use of metal than collar 68, but collar 68 may support seal 62 more effectively. In the embodiment of FIGS. 6 and 7, bodywork 60 is cranked inwards on either side of the vehicle to protect seal 62 from foreign object damage, and to allow ring 78 to be fitted inboard of cranked portion 56 of bar 46.

As can be seen from FIG. 7, in this embodiment, water pressure P would tend to force the essentially tubular section 82 of seal 62 in towards anti-roll bar 46, causing the outer end of seal 62 to lift out of groove 66, as shown at L. In this case, lip seal 72 acts to maintain the profile of seal 62 by pressing against section 80 of ring 78, maintaining the profile of section 82 to maintain the integrity of seal 62. In a further alternative embodiment (not shown), the inner end 80 of ring 78 could be built up in diameter to support section 82 directly, avoiding the need for lip seal 72.

While several embodiments of the invention has been illustrated and described in considerable detail, the present invention is not to be considered limited to the precise construction disclosed. Various adaptations, modifications and uses of the invention may occur to those skilled in the arts to which the invention relates. It is the intention to cover all such adaptations, modifications and uses falling within the scope or spirit of the claims filed herewith.

The invention claimed is:

1. An amphibious vehicle having a hull provided with at least one pair of road wheels, each wheel of the pair being mounted on opposite sides of the vehicle by means of a suspension to the body of the vehicle, the suspension being so arranged as to be enabled by retraction means to retract its wheel upwards into a stowed position, an anti-roll bar being mounted to the body so as to connect a suspension member of each suspension on opposite sides of the vehicle, the anti-roll bar being further arranged to partially rotate from a first position in road mode to a second position in marine mode, wherein the anti-roll bar is sealed within the vehicle by at least one seal.

2. An amphibious vehicle according to claim 1, wherein said pair of wheels are front wheels.

3. An amphibious vehicle according to claim 1, wherein said pair of wheels are rear wheels.

4. An amphibious vehicle according to claim 1, wherein said pair of wheels are steered.

5. An amphibious vehicle according to claim 1, wherein said pair of wheels are driveably commectable to an engine of the vehicle.

6. An amphibious vehicle according to claim 1, wherein said pair of wheels are arranged to be stowed above the vehicle waterline when the vehicle is on water.

7. An amphibious vehicle according to claim 1, wherein the anti-roll bar is mounted to the vehicle by means of at least one bearing, so that when the wheels are retracted, the anti-roll bar rotates about a single axis.

8. An amphibious vehicle according to claim 1, wherein the anti-roll bar seal is an elastomeric seal.

9. An amphibious vehicle according to claim 1, wherein the seal has an internal circular lip portion extending outwardly from an inner part of the seal, the lip portion being arranged to seat against the anti-roll bar.

10. An amphibious vehicle according to claim 1, wherein the anti-roll bar is sealed within the vehicle by means of a seal located to a water tight exterior bodywork of the vehicle, and wherein the seal has an internal circular lip portion extending inwardly from an outer part of the seal, the lip portion being arranged to seat against the anti-roll bar.

11. An amphibious vehicle according to claim 1, wherein the seal has an internal circular lip portion extending outwardly from an inner part of the seal, the lip portion being arranged to seat against an annular part extending around the anti-roll bar.

12. An amphibious vehicle according to claim 1, wherein the anti-roll bar is sealed within the vehicle by means of a seal located to a water tight exterior bodywork of the vehicle, and wherein the seal has an internal circular lip portion extending inwardly from an outer part of the seal, the lip portion being arranged to seat against an annular part extending around the anti-roll bar.

13. An amphibious vehicle according to claim 12, wherein the annular part is continuously welded to the anti-roll bar.

14. An amphibious vehicle according to claim 11, wherein the annular part is continuously welded to the anti-roll bar.

15. An amphibious vehicle according to claim 1, wherein the vehicle has a planing body whereby it may be operated as a planing vehicle in marine mode.

16. An amphibious vehicle according to claim 1, wherein the anti-roll bar is linked to the suspension member of each suspension by a link.

17. An amphibious vehicle according to claim 1, wherein the seal is located to a water tight exterior bodywork of the vehicle.

* * * * *